May 11, 1943.　　　T. R. ARDEN　　　2,318,917
FUEL TANK
Original Filed June 12, 1939

Inventor
Thomas R. Arden,
By Wolhaupter & Groff
Attorneys

Patented May 11, 1943

2,318,917

UNITED STATES PATENT OFFICE 2,318,917

FUEL TANK

Thomas R. Arden, Danbury, Conn.

Original application June 12, 1939, Serial No. 278,772. Divided and this application February 27, 1942, Serial No. 432,712

5 Claims. (Cl. 221—95)

This invention relates to fuel tanks, and has particular reference to a fuel tank as disclosed in my prior application, Serial No. 278,772, filed June 12, 1939, of which the present application is a division.

Generally speaking, the object of the invention is to provide a fuel tank embodying a construction to render available for use at any given time and for any given purpose, only a predetermined part of the total amount of fuel contained therein, thereby to predetermine the time period of operation of an engine or other device supplied with fuel from the tank. In this connection the present fuel tank is of special utility when used in association with miniature internal combustion engines for the propulsion of miniature air, land or water craft to readily predetermine the amount of fuel that is available for operation of the engine and thereby predetermine the period of time that the air, land or water craft is driven under engine power.

According to the invention, the present full tank is provided at its bottom with a well of limited capacity to be supplied with fuel from the tank and from which fuel is supplied to an engine or other fuel operated device, and in this connection a special object of the invention is to provide novel valve means for controlling supply of fuel to said well from said tank and novel adjustable means to regulate the amount of fuel which may be delivered from said well to an engine or other fuel operated device thereby to predetermine the time period of operation of the engine or other device.

With the foregoing and other objects in view, which will become more fully apparent as the nature of the invention is better understood, the same consists in a fuel tank embodying the novel features of construction, combination and arrangement of parts as will be hereinafter more fully described, illustrated in the accompanying drawing and defined in the appended claims.

In the accompanying drawing, wherein like characters of reference denote corresponding parts in the different views.

Figure 1:
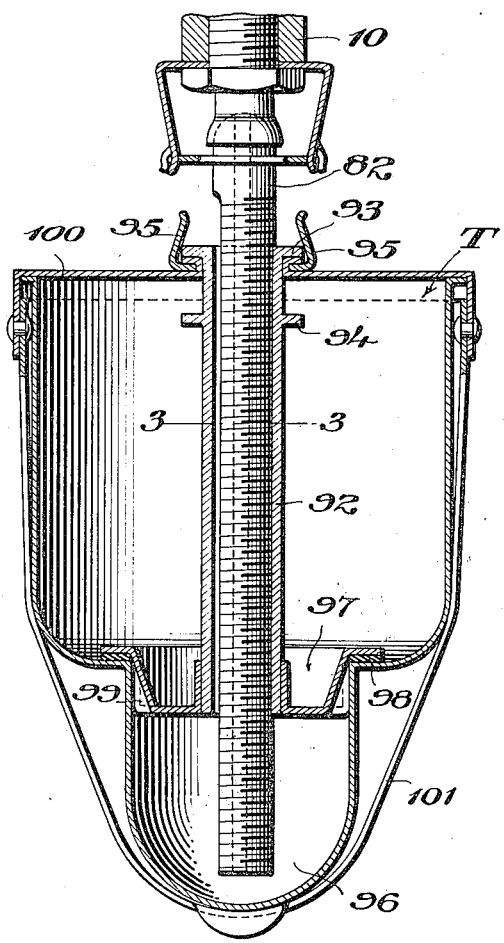
Figure 1 is a central, vertical section through a fuel tank constructed in accordance with one practical embodiment of the invention and showing a status of the parts thereof denying communication between the tank proper and the well at the bottom thereof.

In the drawing the present fuel tank is designated generally as T and, as shown, said tank is provided with a vertically disposed fuel delivery tube 82 which extends through the top 100 of said tank for connection at its upper end in any suitable or preferred manner with an engine or other device, a portion of which is designated as 10, to be supplied with fuel.

The tube 82 extends through and is threaded in a sleeve 92 which is disposed vertically in the tank T, preferably centrally thereof, and which has its upper end portion extending through a central opening in the tank top 100. At its upper end the sleeve 92 is provided with an outwardly extending flange 93, while at a point within the tank T and suitably spaced below the flange 93 said sleeve is provided with a suitable stop 94. The tank T is vertically slidable relative to the sleeve 92, upward movement thereof being limited by engagement of the top 100 thereof with the flange 93 and downward movement thereof being limited by engagement of the top 100 thereof with the stop 94.

Figure 2:
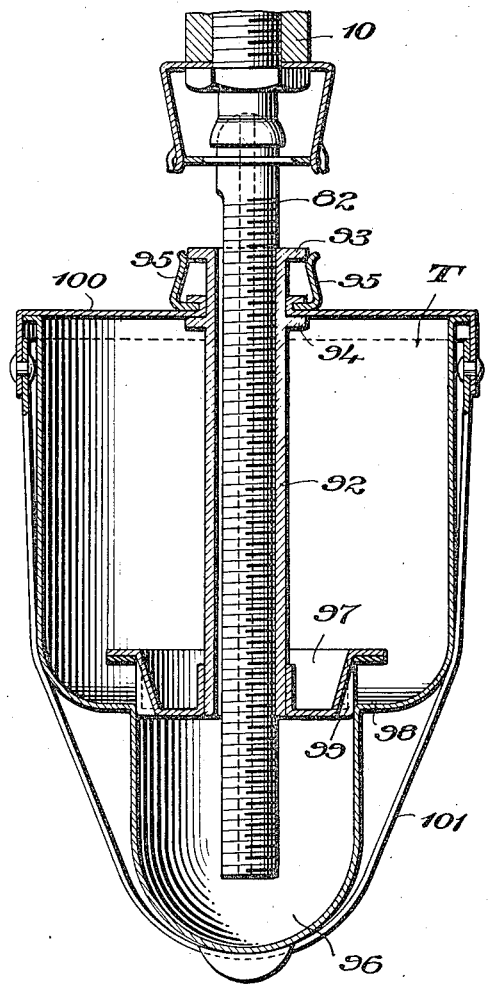
Figure 2 is a view similar to Fig. 1 showing a status of the parts of the tank affording communication between the tank proper and the well at the bottom thereof.
Figure 3:
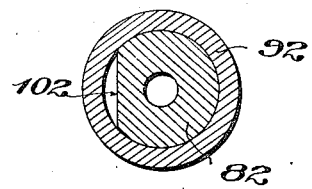
Figure 3 is a cross section on the line 3—3 of Fig. 1.

Suitably secured to the top of the tank T is a U-shaped spring clip having a pair of spring arms 95 disposed at opposite sides of the sleeve 92. These spring arms are inclined upwardly and inwardly and are designed to cooperate with the flange 93 to hold the tank T either in a raised position relative to the sleeve 92, as illustrated in Figure 1, of the drawing, or in a lowered position relative to said sleeve as illustrated in Figure 2 of the drawing.

The bottom of the tank T is in the form of a well 96 of smaller diameter and of considerably lesser capacity than the tank proper. Communication between this well and the tank proper is controlled by a valve 97 cooperating with a seat 98 constituted by an outwardly directed portion of the wall of the tank T at the top of the well 96. The valve 97 is carried by the lower end of the sleeve 92 and is designed to engage the seat 98 and to deny communication between the tank proper and the well 96 when the tank is at its upper limit of movement relative to the sleeve 92. On the other hand, when the tank is at its lower limit of movement relative to the sleeve 92, the seat 98 is spaced below the valve 97 and communication is established between the tank proper and the well 96. The valve 97 preferably is of cup-shape and has a portion thereof disposed constantly in the upper end portion of the well 96 to support the bottom portion of the tank T against lateral movement relative to the sleeve 92. If the valve is of cup-shape its cup portion may have peripheral indentations 99 to afford communication between the well and the tank proper when the tank is in its lower position and the valve is open.

By threaded adjustment of the tube 82 relative to the sleeve 92 the lower end of said tube 82 may be caused to be spaced various different distances from the bottom of the well 96 when the tank T is in either its upper or lower position and the valve 97 is closed. If the adjustment in this respect is such that the lower end of the tube 82 is disposed near the bottom of the well 96 when the tank T is in its lower position and the valve 97 is open, practically all fuel that may be contained in said tank is available for operation of the engine, since the fuel is free to flow from the tank proper into the well 96 and the supply to the engine ceases only when the fuel level drops to the bottom of the tube 82. On the other hand, when the tank T is in its upper position and the valve 97 is closed, only fuel that is contained in the well 96 is available for operation of the engine. Moreover, the amount of fuel contained in the well 96 that is available for operation of the engine depends upon the spacing of the lower end of the tube 82 from the bottom of said well when the tank is in its upper position, since the engine fuel supply will cease as soon as the level of the fuel in the well drops to the bottom of the tube 82. Any suitable scale means may be provided to indicate different spacings of the lower end of the tube 82 above the bottom of the well 96 when the tank T it in its upper position. Each such different spacing corresponds to a certain amount of fuel that is available for operation of the engine. A given amount of fuel will suffice for operation of an engine or other device over a given period of time. Accordingly, the duration of any given period of operation of an engine or other device may be predetermined by relative longitudinal adjustment of the tube 82 and the sleeve 92 to cause the lower end of the tube to be disposed a certain distance above the bottom of the well 96 when the tank T is in its raised position and the valve 97 is closed. In this connection it is understood, of course, that prior to any given limited period of operation of an engine or other device the tank T first is lowered to permit the well 96 to be filled from the tank proper and then is raised to deny any further flow of fuel from the tank proper into said well.

The tank T may be permanently closed at its top and may be provided in its top with a filling opening. Preferably, however, said tank is provided with a cap or cover 100 that is removable to afford access to the tank for filling, cleaning or other purposes. If a removable cap or cover is provided it may be secured in closed relationship to the top of the tank in any suitable manner, as, for example, by means of a bail 101 swingable beneath the well 96.

To vent the well 96, the tube 82 may be exteriorly longitudinally grooved or cut-away at one side as indicated at 102.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. A fuel tank comprising a tank proper having a bottom compartment, valve means controlling flow of fuel from said tank proper into said bottom compartment, a vertical fuel outlet tube having its lower end disposed in said bottom compartment, and means for the vertical adjustment of said tube relative to said tank to dispose its lower end different distances from the bottom of said compartment.

2. A fuel tank comprising a tank proper having a bottom compartment, a valve for controlling flow of fuel from said tank proper into said bottom compartment, an internally threaded vertical sleeve disposed in the tank proper and carrying said valve and extending slidably through the top of the tank, cooperating means on the tank and said sleeve for holding the tank in an upper, valve-opened position and a lower, valve-closed position relative to said sleeve, and a fuel outlet outlet tube extending through said sleeve and having its lower end disposed in said compartment, said tube being threaded in said tube for vertical adjustment relative thereto to vary the spacing of its lower end from the bottom of said compartment.

3. A fuel tank comprising a tank proper having a bottom compartment, a vertical sleeve in said tank with respect to which said tank is vertically movable between raised and lowered positions, valve means carried by said sleeve to deny communication between the tank proper and said bottom compartment when the tank is in its raised position relative to said sleeve and to establish communication between said tank proper and said bottom compartment when said tank is in its lowered position relative to said sleeve, means to hold the tank in its raised and lowered positions relative to said sleeve, a fuel outlet tube extending through said sleeve for connection at its upper end with a device to be supplied with fuel, said tube having its lower end disposed in said compartment, and means for supporting said tank upon said sleeve in different positions of vertical adjustment relative thereto in which the lower end of said tube is disposed different distances from the bottom of said bottom compartment.

4. A fuel tank as set forth in claim 3 including stop means on the sleeve engageable by a part of the tank to predetermine the lowered position of the tank relative to said sleeve, and spring clip means carried by the tank for cooperation with a part of said sleeve to hold the tank in its raised position relative to said sleeve.

5. A fuel tank as set forth in claim 3 in which the tube is formed to provide between the same and the sleeve a duct for venting the bottom compartment to the atmosphere.

THOMAS R. ARDEN.